United States Patent [19]

Jimbo et al.

[11] Patent Number: 4,742,724
[45] Date of Patent: May 10, 1988

[54] POWER-ASSISTED GEAR-SHIFT MECHANISM FOR MANUAL TRANSMISSION

[75] Inventors: Shoji Jimbo; Akira Sato; Fumihiro Ushijima; Kenichi Kikuchi; Hideaki Matsui; Yukio Ohtake, all of Toyota, Japan

[73] Assignee: Toyota Jidosha Kabushiki Kaisha, Toyota, Japan

[21] Appl. No.: 69,832

[22] Filed: Jul. 6, 1987

[30] Foreign Application Priority Data

| Jul. 4, 1986 | [JP] | Japan | 61-158452 |
| Jul. 4, 1986 | [JP] | Japan | 61-158451 |
| Jul. 4, 1986 | [JP] | Japan | 61-158453 |
| Jul. 4, 1986 | [JP] | Japan | 61-103456[U] |
| Jul. 4, 1986 | [JP] | Japan | 61-103458[U] |
| Jul. 4, 1986 | [JP] | Japan | 61-103455[U] |
| Jul. 4, 1986 | [JP] | Japan | 61-103457[U] |

[51] Int. Cl.$^4$ .............. G05G 9/16; F15B 9/10
[52] U.S. Cl. .............. 74/388 R; 74/473 R; 91/374; 91/378
[58] Field of Search .......... 74/388 R, 473 R; 91/374, 376 R, 378

[56] References Cited

U.S. PATENT DOCUMENTS

| 2,926,539 | 3/1960 | Leonard | 91/378 |
| 2,926,635 | 3/1960 | Leonard et al. | 91/378 |
| 3,470,759 | 10/1969 | Labat | 74/388 R X |
| 4,287,784 | 9/1981 | Cedendahl | 74/388 R X |
| 4,485,726 | 12/1984 | Inoue | 74/388 R X |

FOREIGN PATENT DOCUMENTS 4838276  9/1946  Japan .

Primary Examiner—Allan D. Herrmann
Attorney, Agent, or Firm—Oblon, Fisher, Spivak, McClelland & Maier

[57] ABSTRACT

A power-assisted gear shift mechanism for a manual transmission includes a lateral casing mounted on a transmission housing, a first lateral shaft rotatably mounted within the casing and being operatively connected to a manual shift lever to be rotated in shifting operation of the shift lever, and a second lateral shaft in the form of a hollow shaft rotatably and axially slidably mounted on the first lateral shaft and being operatively connected to the manual shift lever to be axially moved in selecting operation of the shift lever, the second lateral shaft being integrally provided with a shift-and-select lever which extends into an interior of the transmission housing to be selectively engaged with a plurality of shift heads in axial movement of the second lateral shaft. The gear-shift mechanism is associated with a hydraulic power cylinder assembly which is integrally connected to one end of the lateral casing to provide a hydraulic power assist in accordance with operation torque applied to the first lateral shaft in shifting operation of the manual shift lever.

12 Claims, 9 Drawing Sheets

POWER-ASSISTED GEAR-SHIFT MECHANISM FOR MANUAL TRANSMISSION

BACKGROUND OF THE INVENTION

1. Field of the Invention

The present invention relates to a gear-shift mechanism for a manual transmission in automotive vehicles, and more particularly to a power-assisted gear-shift mechanism capable of providing a hydraulic power assist to the operator's effort applied to a manual shift lever of the transmission in shifting operation thereof.

2. Discussion of the Background

In conventional manual transmissions, selecting operation of the manual shift lever is effected by a small effort. It is, however, required to apply a large effort to the manual shift lever in shifting operation thereof particularly in an automotive vehicle equipped with a prime mover of large torque and a large size clutch assembly. In Japanese Utility Model Early Publication No. 48-38276, there has been proposed a power-assisted gear-shift mechanism which is provided with a pneumatic power cylinder assembly for providing a pneumatic power assist to the operator's effort applied to the manual shift lever in shifting operation thereof. The power cylinder assembly includes a cylinder casing, a piston rod axially slidably disposed within the cylinder casing in an air-tight manner to subdivide the interior of the casing into two pressure chambers, and a valve mechanism for selectively supplying the air under pressure to the pressure chambers through the piston rod. However, the valve mechanism is composed of a large number of component parts and complicated in construction, resulting in an increase of manufacturing cost.

SUMMARY OF THE INVENTION

It is, therefore, a primary object of the present invention to provide a power-assisted gear-shift mechanism which is associated with a hydraulic power cylinder assembly composed of a small number of component parts in a simple construction.

A secondary object of the present invention is to provide a power-assisted gear-shift mechanism, having the above-described characteristics, capable of providing a hydraulic power assist in accordance with the operator's effort applied to the manual shift lever.

A tertiary object of the present invention is to provide a power-assisted gear-shift mechanism, having the above-described characteristics, capable of preventing occurrence of an excessive hydraulic power assist to the operator's effort applied to the manual shift lever and of effecting shifting operation of the gear-shift mechanism even if the power cylinder assembly has been damaged.

According to the present invention, the primary object is attained by providing a power-assisted gear-shift mechanism for a manual transmission which comprises a lateral casing mounted on a transmission housing, a first lateral shaft rotatably mounted within the lateral casing and being operatively connected to a manual shift lever to be rotated in shifting operation of the shift lever, and a second lateral shaft in the form of a hollow shaft rotatably and axially slidably mounted on the first lateral shaft and being connected to the manual shift lever to be axially moved in selecting operation of the shift lever, the second lateral shaft being integrally provided with a shift-and-select lever which extends into an interior of the transmission housing to be selectively engaged with a plurality of shift heads in axial movement of the second lateral shaft, wherein the gear-shift mechanism is associated with a hydraulic power cylinder assembly which includes a cylinder casing integrally connected to one end of the lateral casing and extending along one side of the transmission housing, the cylinder casing being provided with an inlet port for connection to a source of hydraulic pressure and an outlet port for connection to a fluid reservoir, a hollow piston shaft having a piston part axially slidably disposed within the cylinder casing to subdivide an interior of the cylinder casing into two fluid chambers, the piston shaft being operatively connected at one end thereof to the second lateral shaft to cause rotation of the second lateral shaft in axial movement thereof, and a valve spool axially slidably disposed within the piston shaft and being operatively connected at one end thereof to the first lateral shaft to be displaced by rotation of the first lateral shaft, the valve spool cooperating with the piston part of the piston shaft for selectively directing hydraulic fluid under pressure from the pressure source to the fluid chambers through the inlet port in accordance with relative displacement of the piston shaft and the valve spool.

In the power-assisted gear-shift mechanism, the second lateral shaft may be replaced with a hollow shaft rotatably mounted on the first lateral shaft and rotatably supported in place within the lateral casing. In this arrangement, a slide sleeve is axially slidably mounted on the hollow shaft and operatively connected to the manual shift lever to be axially moved in selecting operation of the shift lever, the slide sleeve being integrally provided with a shift-and-select lever which extends into the interior of the transmission housing to be selectively engaged with the shift heads in axial movement of the slide sleeve.

To attain the secondary object of the present invention, the piston shaft and the valve spool are connected to each other at their one ends by means of a resilient member to be relatively displaced in accordance with operation torque applied to the first lateral shaft. It is preferable that the resilient member consists of a pair of parallel leaf springs connected to each other at their one ends, wherein one of the leaf springs is fixed at another end thereof to one end of the piston shaft, and the other leaf spring is fixed at another end thereof to one end of the valve spool.

To attain the tertiary object of the present invention, the power-assisted gear-shift mechanism is provided with means for restricting relative rotation of the lateral shafts in a predetermined extent.

BRIEF DESCRIPTION OF THE DRAWINGS

Additional objects, features and advantages of the present invention will be readily appreciated from the following detailed description of preferred embodiments thereof when considered with reference to the accompanying drawings, in which.

DESCRIPTION OF THE PREFERRED EMBODIMENTS

Figure 1:
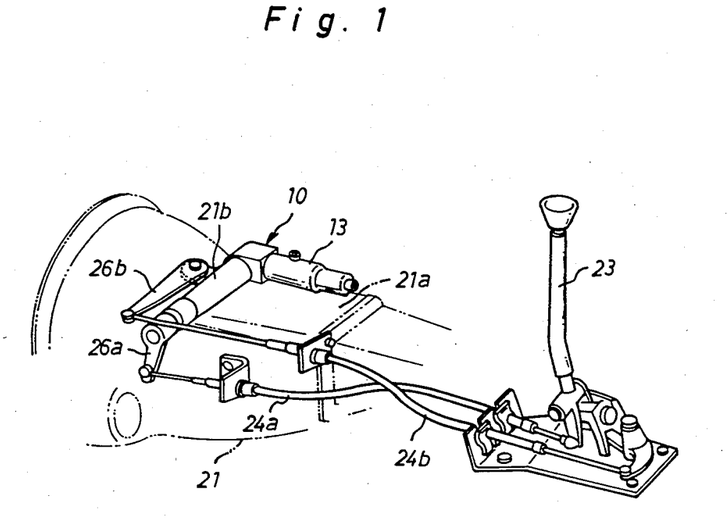
FIG. 1 is a perspective view of a power-assisted gear-shift mechanism in accordance with the present invention.
Figure 2:
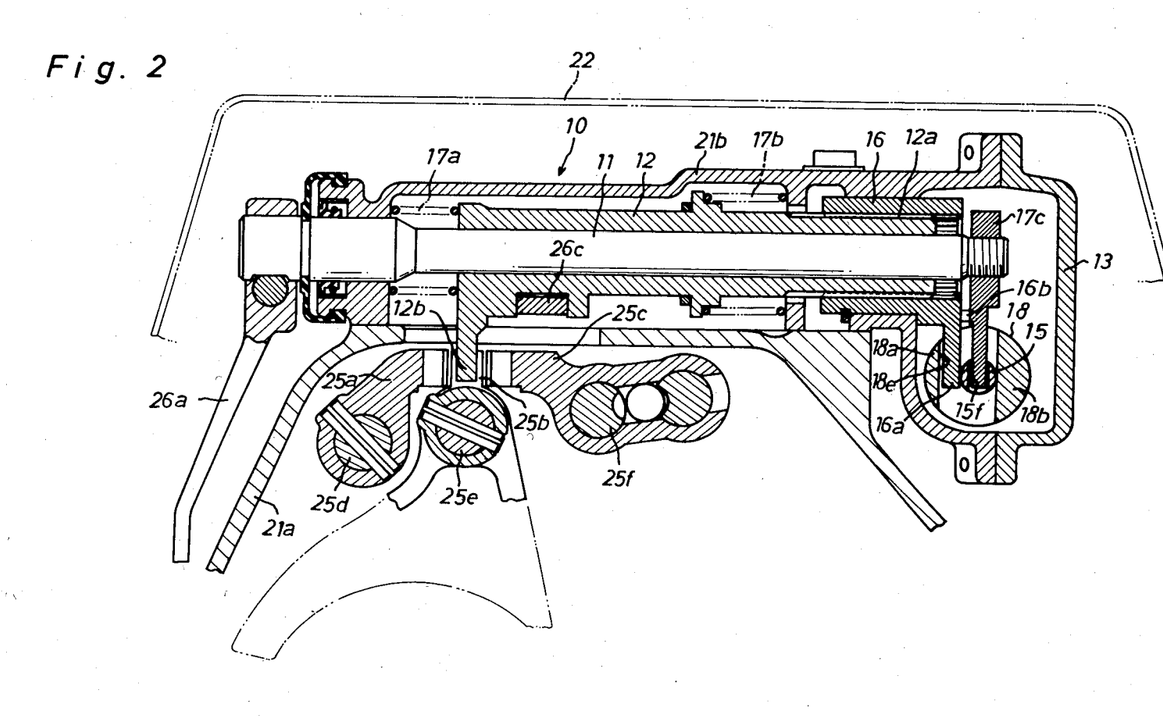
FIG. 2 is an enlarged vertical sectional view of the power-assisted gear-shift mechanism shown in FIG. 1.

Referring now to the drawings, FIG. 1 illustrates a power-assisted gear-shift mechanism 10 for a manual transmission 21 in an automotive vehicle, which is mounted on a housing 21a of the manual transmission 21 and located between the upper portion of transmission housing 21a and a floor 22 of the vehicle compartment, as shown in FIG. 2. A manual shift lever 23 is mounted on the vehicle compartment floor 22 and connected to the gear-shift mechanism 10 by way of push-pull cables 24a and 24b to effect shifting operation of the gear-shift mechanism 10 when operated in a fore-and-aft direction and to effect selecting operation of the gear-shift mechanism 10 when operated in a lateral direction.

Figures 3, 4, 5:
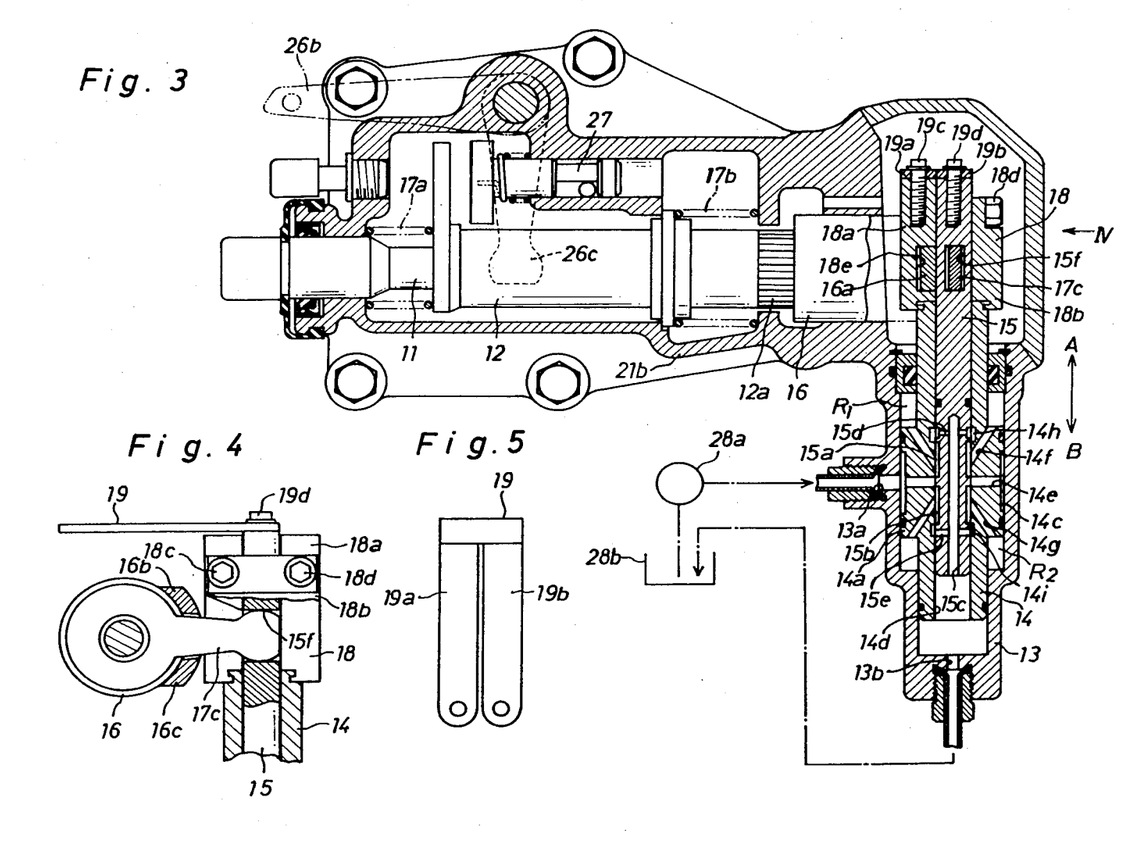
FIG. 3 is an enlarged horizontal sectional view of the power-assisted gear-shift mechanism in FIG. 1.
FIG. 4 is an enlarged elevation in partial section shown by an arrow IV in FIG. 3.
FIG. 5 is a plan view of a resilient member shown in FIG. 4.

As shown in FIGS. 2 and 3, the gear-shift mechanism 10 includes first and second lateral shafts 11 and 12 and is associated with a power cylinder assembly including a cylinder casing 13, a piston shaft 14 and a valve spool 15. The first lateral shaft 11 is rotatably supported in a fluid-tight manner from a lateral casing 21b, which is fixedly mounted on the upper portion of transmission housing 21a, and extends outwardly from the lateral casing 21b at its one end. The second lateral shaft 12 is in the form of a hollow shaft which is rotatably and slidably mounted on the first lateral shaft 11. The hollow lateral shaft 12 has one end portion formed with an external spline 12a and another end portion integrally formed with a shift-and-select lever 12b. An internally splined connecting sleeve 16 is axially slidably coupled with the external spline 12a of shaft 12 and is rotatably mounted in place within the lateral casing 21b to permit rotation of the lateral shaft 12. The lateral shaft 12 is resiliently retained in a neutral position under biasing forces of a pair of opposed compression coil springs 17a and 17b engaged therewith. The shift-and-select lever 12b extends into an interior of the transmission housing 21a and is arranged to be selectively brought into engagement with first, second and third shift heads 25a, 25b and 25c respectively for establishment of a first or second speed gear train, for establishment of a third or fourth speed gear train, and for establishment of a fifth speed or reverse gear train. The shift heads 25a, 25b and 25c are mounted in a usual manner on fork shafts 25d, 25e and 25f, respectively.

The first push-pull cable 24a has an inner wire connected at its one end to the manual shift lever 23 and at its other end to a swingable lever 26a fixed to the outer end of lateral shaft 11, while the second push-pull cable 24b has an inner wire connected at its one end to the manual shaft lever 23 and at its other end to a crank lever 26b pivotally mounted on the lateral casing 21b. As shown in FIG. 3, the crank lever 26b is integrally connected at its base to another crank lever 26c for rotation therewith. As shown in FIG. 2, the crank lever 26c is engaged at its movable end with a recessed portion of lateral shaft 12 to cause axial movement of the lateral shaft 12 in rotation of the crank lever 26a.

As shown in FIG. 1, the cylinder casing 13 of the power cylinder assembly is integrally connected to the right end of lateral casing 21b and extends rearwardly along one side of the transmission housing 21a. As shown in FIG. 3, the cylinder casing 13 is provided at its intermediate portion with an inlet port 13a connected to a source of hydraulic pressure in the form of a fluid pump 28a and is provided at its rear end with an outlet port 13b connected to a fluid reservoir 28b. The piston shaft 14 is in the form of a hollow shaft which is formed with a piston part 14a of large diameter axially slidable in the cylinder casing 13. The piston part 14a of hollow shaft 14 subdivides the interior of cylinder casing 13 into two fluid chambers $R_1$ and $R_2$. The piston part 14a of hollow shaft 14 acts as a valve sleeve cooperable with the valve spool 15, which piston part 14a is formed with an annular groove 14c in open communication with the inlet port 13a, a plurality of radial passages 14e between the annular groove 14c and an axial bore 14d of shaft 14, a plurality of passages 14f and 14g between the axial bore 14d of shaft 14 and the fluid chambers $R_1$, $R_2$, and a pair of axially spaced annular grooves 14h and 14i in open communication with the axial bore 14d of shaft 14.

The valve spool 15 is in the form of a rod-like member which is axially slidably disposed within the axial bore 14d of shaft 14 to cooperate with the piston part 14a of shaft 14 thereby to provide a changeover valve of the open center type. The rod-like valve spool 15 is formed with a pair of axially spaced annular grooves 15a and 15b each in open communication with the passages 14f and 14g in shaft 14, an axial blind bore 15c in open communication with the outlet port 13b, and axially spaced radial passages 15d and 15e each in open communication with the axial bore 15c and the annular grooves 14h, 14i of shaft 14.

As shown in FIGS. 2, 3 and 4, a pair of semicylindrical members 18a and 18b are coupled with the front end of piston shaft 14 and secured in place by means of fastening bolts 18c and 18d. The semicylindrical member 18a is formed with a radial groove 18e for engagement with a swingable arm 16a of connecting sleeve 16. With such arrangement of the semicylindrical member 18a, the piston shaft 14 is connected to the lateral shaft 12 through the connecting sleeve 16 to cause rotation of the lateral shaft 12 in its axial movement. The rod-like valve spool 15 is formed with a radial groove 15f for engagement with an arm member 17c which is fixed to the right end of lateral shaft 11 for rotation therewith. With such arrangement of the radial groove 15f, the valve spool 15 is connected to the lateral shaft 11 through the arm member 17c to cause shifting movement thereof in rotation of the lateral shaft 11. As shown in FIGS. 2 and 4, the connecting sleeve 16 is integrally provided with a pair of circumferentially spaced stoppers 16b and 16c which are arranged to restrict rotation of the arm member 17c by abutment therewith in a predetermined extent. After the arm member 17c abuts against either one of the stoppers 16b or 16c in its rotary movement, it causes the connecting sleeve 16 to rotate with the lateral shaft 12.

The piston shaft 14 and valve spool 15 are connected to each other at their front ends by means of a resilient member 19. As shown in FIG. 5, the resilient member 19 consists of a pair of parallel leaf springs 19a and 19b which are integrally connected to each other at their one ends and fixed at their other ends to the front ends of piston shaft 14 and valve spool 15 by means of fastening bolts 19c and 19d. When operation torque applied to the lateral shaft 11 exceeds a predetermined value, the leaf spring 19b is bent relatively to the leaf spring 19a to cause relative displacement between the piston shaft 14 and valve spool 15. In FIG. 3, the reference numeral 27 represents a conventional mechanism for preventing an error in shifting operation of the manual shaft lever toward its reverse-ratio position from its forward speed-ratio position.

In operation of the gear-shift mechanism 10, the crank levers 26b and 26c are rotated by the manual shift lever 23 in its selecting operation to cause axial movement of the lateral shaft 12. This results in engagement of the shift-and-select lever 12b with either one of the shift heads 25a, 25b or 25c. When the manual shift lever 23 is shifted in the fore-and-aft direction to rotate the swingable lever 26a, the lateral shaft 11 rotates with the arm member 17c to cause axial movement of the valve spool 15. In such initial shifting operation of the manual shift lever 23, the resilient member 19 acts to cause axial movement of the piston shaft 14 in accordance with the axial movement of valve spool 15, and in turn, the swingable arm 16a of connecting sleeve 16 is rotated by the axial movement of piston shaft 14 to rotate the lateral shaft 12 so as to effect shifting operation of the selected shift head 25a, 25b or 25c. When the manual shift lever 23 is applied with a load due to operation of a synchronizer (not shown) associated with the selected shift head, operation torque applied to the lateral shaft 11 exceeds the predetermined value. As a result, the leaf spring 19b is bent to cause relative displacement between the piston shaft 14 and valve spool 15 for activating the power cylinder assembly.

Assuming that there is not any relative displacement between the piston shaft 14 and valve spool 15 in shifting operation of the manual shift lever 23, hydraulic fluid under pressure supplied into the inlet port 13a of cylinder casing 13 from the pump 28a flows into the annular grooves 15a, 15b through the annular groove 14c and radial passages 14e and flows toward the outlet port 13b through the annular grooves 14h, 14i, radial passages 15d, 15e and axial bore 15c to return into the fluid reservoir 28b. Assuming that the valve spool 15 is displaced relatively to the piston shaft 14 in a direction shown by an arrow A in FIG. 3, fluid communication between radial passages 14e and annular groove 15a is blocked, while fluid communication between radial passages 14e and annular groove 15b is established. Simultaneously, fluid communication between annular grooves 15a and 14b is established, while fluid communication between annular grooves 15b and 14i is blocked. Thus, the hydraulic fluid under pressure is supplied into the chamber $R_2$ from the radial passages 14e through the annular groove 15b and passages 14g, while the hydraulic fluid in chamber $R_1$ is exhausted from the outlet port 13b into the fluid reservoir 28b through the passages 14f, annular grooves 15a, 14h, radial passages 15d and axial bore 15c. As a result, the piston shaft 14 is axially moved by the hydraulic fluid under pressure in chamber $R_2$ in the direction A to rotate the lateral shaft 12. This will provide a hydraulic power assist to the operator's effort applied to the manual shift lever 23.

When the valve spool 15 is displaced relatively to the piston shaft 14 in a direction shown by an arrow B in FIG. 3, fluid communication between the radial passages 14e and annular groove 15a is established, while fluid communication between the radial passages 14e and annular groove 15b is blocked. Simultaneously, fluid communication between the annular grooves 15a and 14h is blocked, while fluid communication between the annular grooves 15b and 14i is established. As a result, the piston shaft 14 is applied with the hydraulic fluid under pressure in chamber $R_1$ to move in the direction B thereby to provide a hydraulic power assist to the operator's effort applied to the manual shift lever 23.

As is understood from the above description, the gear-shift mechanism 10 is characterized in that the power cylinder assembly is arranged at one side of the lateral shafts 11 and 12 and is mainly composed of the cylinder casing 13, piston shaft 14 and valve spool 15 in a simple construction. With such arrangement of the power cylinder assembly, the gear-shift mechanism 10 can be mounted in such a limited space between the transmission housing 21a and the vehicle compartment floor 22 as shown in FIG. 2. Furthermore, the power cylinder assembly is characterized in that the resilient member 19 is adapted to connect the piston shaft 14 and the valve spool 15 to each other in such a manner as to cause relative displacement thereof in accordance with operation torque applied to the lateral shaft 11. With such arrangement of the resilient member 19, it is able to provide a hydraulic power assist in accordance with the operator's effort applied to the manual shift lever 23. This is effective to ensure the operator's feel in shifting operation of the manual transmission. In the above-described embodiment, the stoppers 16b and 16c of connecting sleeve 16 are arranged to restrict relative rotation of the lateral shafts 11 and 12 in a predetermined extent and to restrict relative displacement of the piston shaft 14 and valve spool 15 in a predetermined extent. This is effective to prevent occurence of an excessive hydraulic power assist to the operator's effort applied to the manual shift lever 23 and to provide a mechanical connection between the lateral shafts 11 and 12 for effecting shifting operation of the transmission even if the power cylinder assembly has been damaged.

Figure 6:
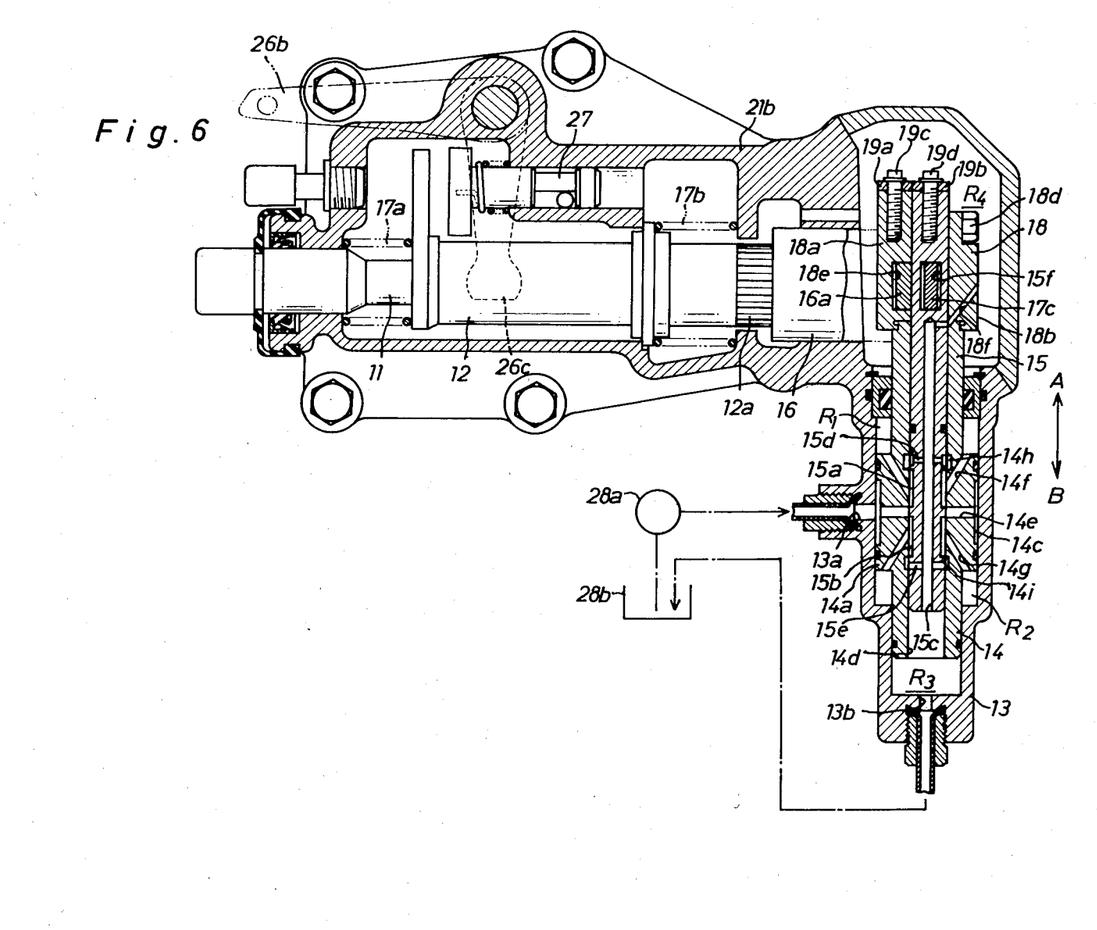
FIG. 6 is an enlarged horizontal sectional view of a modification of the hydraulic power cylinder assembly shown in FIGS. 2 and 3.

In FIG. 6 there is illustrated a modification of the power cylinder assembly described above, wherein the axial blind bore 15c of valve spool 15 extends toward the front end of piston shaft 14, and wherein the semicylindrical member 18b is formed with a passage 18f which is arranged to communicate the front end of axial bore 15c into a front cavity $R_4$ in the cylinder casing 13. In this modification, a rear cavity $R_3$ in the cylinder casing 13 is communicated with the front cavity $R_4$ through the axial bore 15c of valve spool 15 so that the piston shaft 14 is applied with the same hydraulic pressure at the opposite ends thereof. This is useful to effect slight relative displacement of the piston shaft 14 and valve spool 15 without any influence caused by an exhaust pressure of hydraulic fluid.

Figure 7:
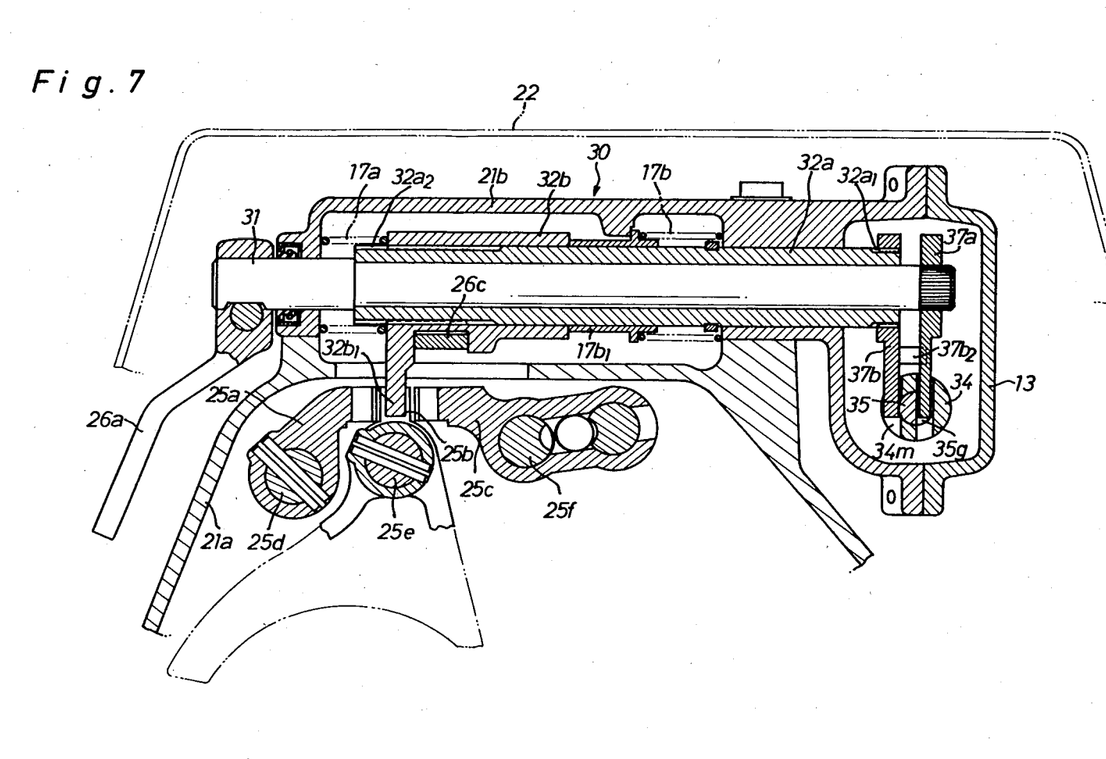
FIG. 7 is an enlarged vertical sectional view of a modification of the power-assisted gear-shift mechanism shown in FIGS. 2 and 3.
Figures 8, 9:
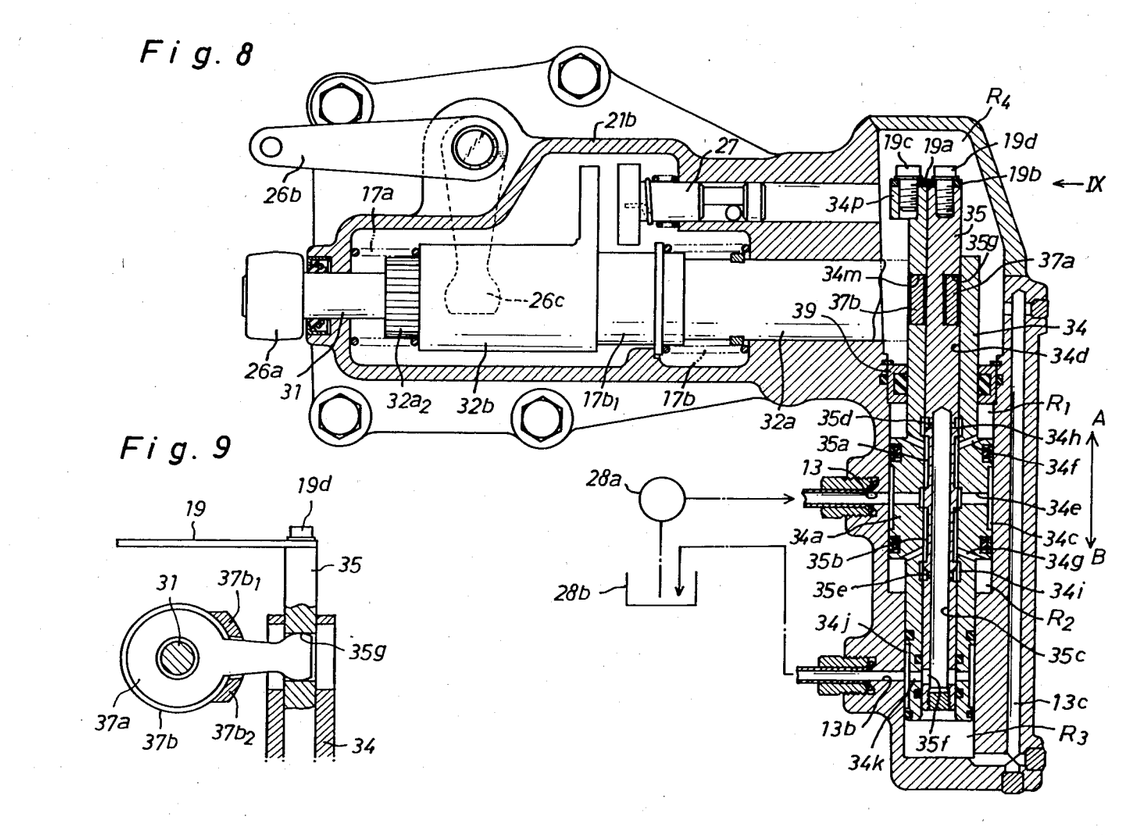
FIG. 8 is an enlarged horizontal sectional view of the modification shown in FIG. 7.
FIG. 9 is an enlarged elevation in partial section shown by an arrow IX in FIG. 8.

In FIGS. 7 and 8 there is illustrated a modification of the gear-shift mechanism 10 which is in the form of a gear-shift mechanism 30 including first and second lateral shafts 31 and 32a and is associated with a power cylinder assembly including a piston shaft 34 and a valve spool 35 assembled within the cylinder casing 13. The first lateral shaft 31 is rotatably supported in a fluid-tight manner from the lateral casing 21b and extends outwardly from the lateral casing 21b at its one end. The second lateral shaft 32a is in the form of a hollow shaft which is rotatably coupled with the first lateral shaft 31 and rotatably supported in place from the lateral casing 21b. The hollow lateral shaft 32a has one end portion formed with an external spline $32a_1$ and another end portion formed with an external spline $32a_2$. An internally splined slide sleeve 32b is integrally formed with a shift-and-select lever $32b_1$ and is axially slidably coupled with the external spline $32a_2$ of lateral shaft 32a for rotation therewith. The slide sleeve 32b is resiliently retained in a neutral position under biasing forces of the opposed compression coil springs 17a and 17b engaged therewith. The shift-and-select lever $32b_1$ extends into the interior of transmission housing 21a and is arranged to be selectively brought into engagement with the first, second and third shift heads 25a, 25b and 25c. In the gear-shift mechanism 30, the swingable lever 26a is fixed to the outer end of lateral shaft 31 for rotation on therewith, and the crank lever 26c is engaged at its movable end with a recessed portion of slide sleeve 32b.

As shown in FIG. 8, the cylinder casing 13 of the power cylinder assembly is provided at its intermediate portion with the inlet and outlet ports 13a and 13b. The piston shaft 34 is in the form of a hollow shaft which is formed with a piston part 34a of large diameter axially slidable in the cylinder casing 13. The piston part 34a of hollow shaft 34 subdivides the interior of cylinder casing 13 into two fluid chambers $R_1$ and $R_2$. In this power cylinder assembly, the cylinder casing 13 is formed in its peripheral wall with a passage 13c through which a front cavity $R_4$ of cylinder casing 13 is communicated with a rear cavity $R_3$ of cylinder casing 13. The piston part 34a of hollow shaft 34 acts a valve sleeve cooperable with the valve spool 35, which piston part 34a is formed with an annular groove 34c in open communication with the inlet port 13a, a plurality of radial passages 34e between the annular groove 34c and an axial bore 34d of shaft 34, a plurality of passages 34f and 34g between the axial bore 34d of shaft 34 and the fluid chambers $R_1$ and $R_2$, and a pair of axially spaced annular grooves 34h and 34i in open communication with the axial bore 34d of shaft 34.

The valve spool 35 is in the form of a rod-like member which is axially slidably disposed within the axial bore 34d of shaft 14 to cooperate with the piston part 34a of shaft 34 thereby to provide a changeover valve of the open center type. The rod-like valve spool 35 is formed with a pair of axially spaced annular grooves 35a and 35b each in open communication with the passages 34f and 34g in shaft 34, an axial blind bore 35c closed by a plug at its open end, and axially spaced radial passages 35d and 35e each in open communication with the axial bore 35c and the annular grooves 34h, 34i of shaft 34. Additionally, the hollow piston shaft 34 is formed with an annular groove 34j and radial passages 34k in open communication with the outlet port 13b, while the valve spool 35 is formed with radial passages 35f between the axial bore 35c and the radial passages 35f. Thus, the axial bore 35c is communicated with the outlet port 13b through the radial passages 35f, 34k and annular groove 34j.

Figure 10:
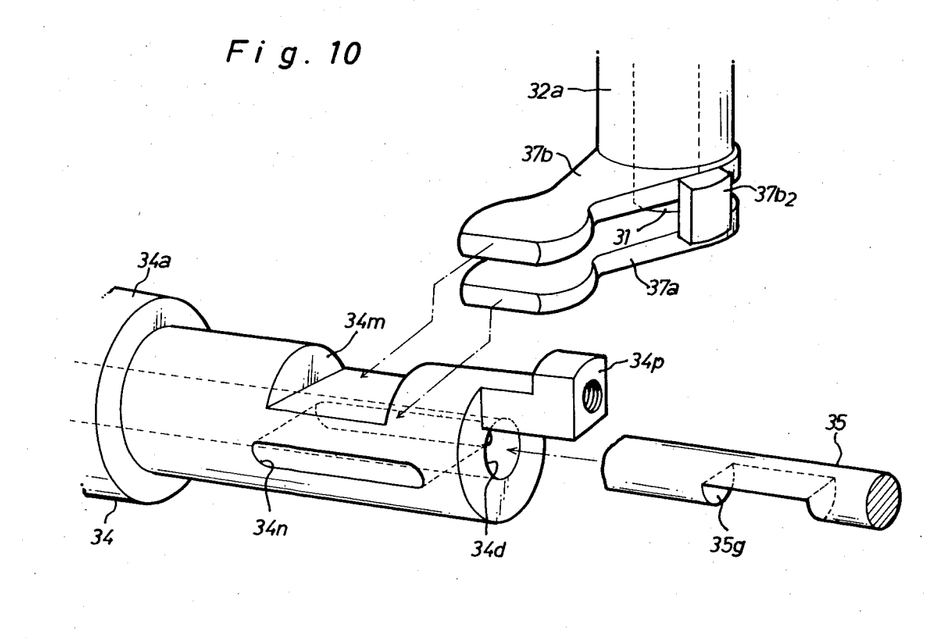
FIG. 10 is an enlarged exploded perspective view of component parts of the power cylinder assembly shown in FIGS. 7 and 8.
Figure 11A:
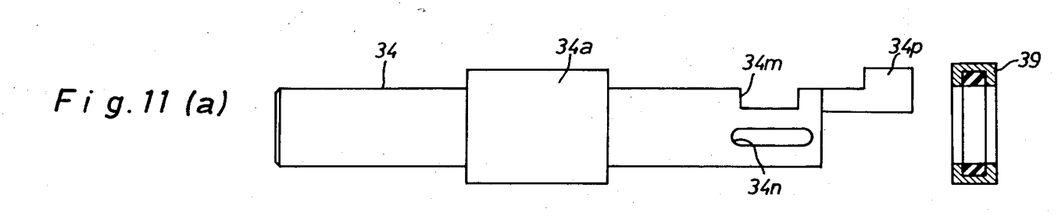
FIGS. 11(a) to 11(d) illustrate a coupling method of an annular seal member in the power cylinder assembly shown in FIG. 8.
Figure 11B:
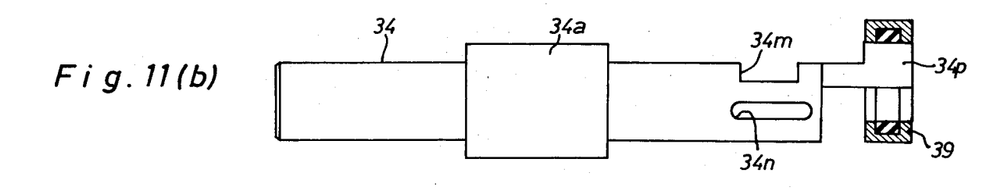
Figure 11C:
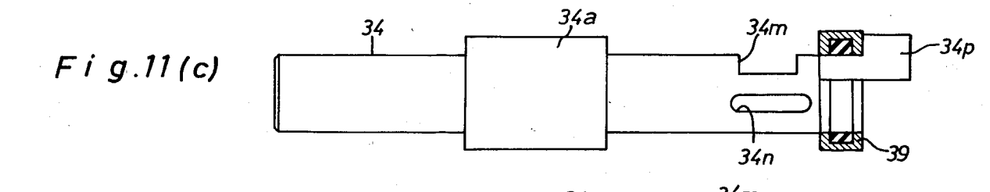
Figure 11D:
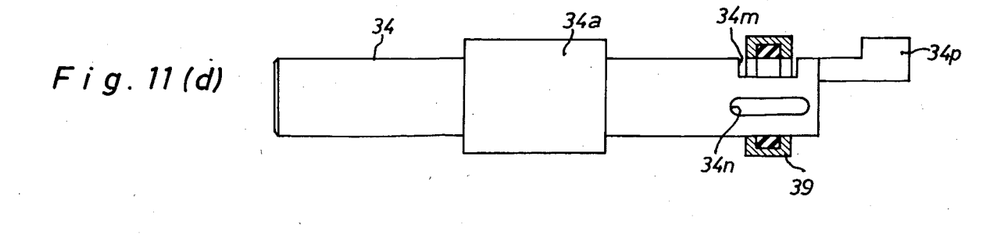

As shown in FIGS. 7, 9 and 10, a swingable arm member 37a is splined to the inner end of lateral shaft 31 for rotation therewith and engaged with a radial recess 35g in the front end portion of valve spool 35. Similarly, a swingable arm member 37b is splined to the inner end $32a_1$ of lateral shaft 32a for rotation therewith and engaged with a radial recess 34m in the front end portion of piston shaft 34. As shown in FIG. 10, the piston shaft 34 is formed at its front end portion with an elongated through hole 34n through which the swingable arm member 37a is inserted into the radial recess 35g of valve spool 35. The piston shaft 34 is further formed at its front end portion with a stepped boss 34p. With the above arrangement, the piston shaft 34 is connected to the lateral shaft 32a through the arm member 37b to cause rotation of the lateral shaft 32a in its axial movement. The rod-like valve spool 35 is connected to the lateral shaft 31 through the arm member 37a to cause axial movement thereof in rotation of the lateral shaft 31. As shown in FIGS. 9 and 10, the arm member 37b is integrally provided with a pair of circumferentially spaced stoppers $37b_1$ and $37b_2$ which are arranged to restrict rotation of the swingable arm member 37a by abutment therewith in a predetermined extent. After the swingable arm member 37a abuts against either one of the stoppers $37b_1$ and $37b_2$ in its rotary movement, it causes the lateral shaft 32a to rotate with the slide sleeve 32b. As shown in FIGS. 8 and 9, the piston shaft 34 and valve spool 35 are connected to each other at their front ends by means of the resilient member 19. In this power cylinder assembly, the leaf spring 19a is fixed to the stepped boss 34p of piston shaft 34 by means of the fastening bolt 19c, while the leaf spring 19b is fixed to the front end of valve spool 35 by means of the fastening bolt 19d. When operation torque applied to the lateral shaft 31 exceeds a predetermined value, the leaf spring 19b is bent relatively to the leaf spring 19a to cause relative displacement between the piston shaft 34 and valve spool 35.

In operation of the gear-shift mechanism 30, the crank levers 26b and 26c are rotated by the manual shift lever 23 in its selecting operation to cause axial movement of the slide sleeve 32b. This results in engagement of the shift-and-select lever $32b_1$ with either one of the shift heads 25a, 25b or 25c. When the manual shift lever 23 is shifted in the fore-and-aft direction to rotate the swingable lever 26a, the lateral shaft 31 rotates with the swingable arm member 37a to cause axial movement of the valve spool 35. In such initial shifting operation of the manual shift lever 23, the resilient member 19 acts to cause axial movement of the piston shaft 34 in accordance with the axial movement of valve spool 35, and in turn, the swingable arm member 37b is rotated by the axial movement of piston shaft 34 to rotate the lateral shaft 32a so as to effect shifting operation of the selected shift head 25a, 25b or 25c. When the manual shift lever 23 is applied with a load due to operation of the synchronizer associated with the selected shift head, operation torque applied to the lateral shaft 31 exceeds the predetermined value. As a result, the leaf spring 19b is bent to cause relative displacement between the piston shaft 34 and valve spool 35 for activating the power cylinder assembly.

Assuming that there is not any relative displacement between the piston shaft 34 and valve spool 35 in shifting operation of the manual shift lever 23, hydraulic fluid under pressure supplied into the inlet port 13a of cylinder casing 13 from the pump 28a flows into the annular grooves 35a, 35b through the annular groove 34c and radial passages 34e and flows toward the outlet port 13b through the annular grooves 34h, 34i, radial passages 35d, 35e, axial bore 35c, radial passages 18f, 34k and annular groove 34j to return into the fluid reservoir 28b. Assuming that the valve spool 35 is displaced relatively to the piston shaft 34 in a direction shown by an arrow A in FIG. 8, fluid communication between radial passages 34e and annular groove 35a is blocked, while fluid communication between radial passages 34e and annular groove 35b is established. Simultaneously, fluid communication between annular grooves 35a and 34h is established, while fluid communication between annular grooves 35b and 34i is blocked. Thus, the hydraulic fluid under pressure is supplied into the chamber $R_2$ from the radial passages 34e through the annular groove 35b and passages 34g, while the hydraulic fluid in chamber $R_1$ is exhausted from the outlet port 13b into the fluid reservoir 28b through the passages 34f, annular groove 35a 34h, radial passages 35d, axial bore 35c, radial passages 35f, 34k and annular groove 34j. As a result, the piston shaft 34 is axially moved by the hydraulic fluid under pressure in chamber $R_2$ in the direction A to rotate the lateral shaft 32a and slide sleeve 32b. This will provide a hydraulic power assist to the operator's effort applied to the manual shift lever 23.

As is understood from the above description, the gear-shift mechanism 30 is characterized in that the lateral shafts 31 and 32a are connected to the valve spool 35 and piston shaft 34 by means of the arm members 37a and 37b, respectively and that the arm members 37a and 37b are engaged at their movable ends with the respective radial recesses 35g, 34m in the valve spool 35 and piston shaft 34 in a simple construction. Additionally, it is advantageous that an annular seal member 39 for the piston shaft 34 can be assembled in place in a simple manner as shown in FIGS. 11(a) to 11(d).

Figures 12, 13, 14:
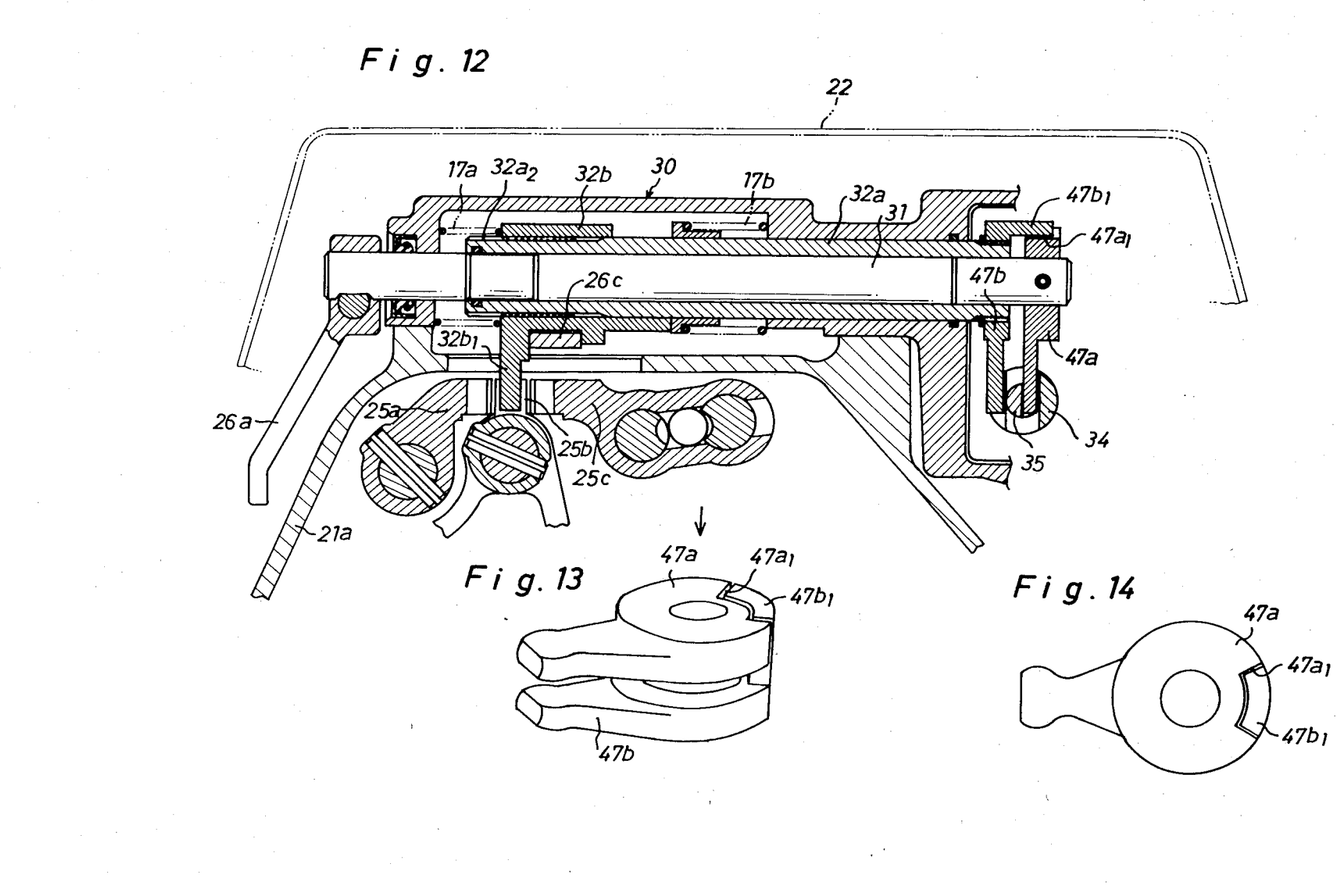
FIG. 12 is an enlarged vertical sectional view of another modification of the power-assisted gear-shift mechanism shown in FIGS. 2 and 3.
FIG. 13 is an enlarged perspective view of swingable arm members shown in FIG. 12.
FIG. 14 is an enlarged plan view of the swingable arm members shown in FIG. 13.

In FIG. 12 there is illustrated a modification of the gear-shift mechanism 30 wherein the arm members 37a and 37b are replaced with swingable arm members 47a and 47b which are fixed to the lateral shafts 31 and 32a, respectively. The arm member 47a is formed at its base portion with a semi-circular recess 47$a_1$, while the arm member 47b is integrally formed at its base portion with a projection 47$b_1$ of semi-circular cross section which is coupled within the semi-circular recess 47$a_1$ to restrict relative rotation of the lateral shafts 31 and 32a in a predetermined extent.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power-assisted gear-shift mechanism for a manual transmission in an automotive vehicle, comprising:

a lateral casing mounted on a housing of said transmission;

a first lateral shaft rotatably mounted within said lateral casing and being operatively connected to a manual shift lever to be rotated in shifting operation of said shift lever; and a second lateral shaft in the form of a hollow shaft rotatably and axially slidably mounted on said first lateral shaft and being operatively connected to said manual shift lever to be axially moved in selecting operation of said shift lever, said second lateral shaft being integrally provided with a shift-and-select lever which extends into an interior of said transmission housing to be selectively engaged with a plurality of shift heads in axial movement of said second lateral shaft;

wherein the power-assisted gear-shift mechanism is associated with a hydraulic power cylinder assembly which includes a cylinder casing integrally connected to one end of said lateral casing and extending along one side of said transmission housing, said cylinder casing being provided with an inlet port for connection to a source of hydraulic pressure and an outlet port for connection to a fluid reservoir; a hollow piston shaft having a piston part axially slidably disposed within said cylinder casing to subdivide an interior of said cylinder casing into two fluid chambers, said piston shaft being operatively connected at one end thereof to said second lateral shaft to cause rotation of said second lateral shaft in axial movement thereof; and a valve spool axially slidably disposed within said piston shaft and being operatively connected at one end thereof to said first lateral shaft to be displaced by rotation of said first lateral shaft, said valve spool cooperating with the piston part of said piston shaft for selectively directing hydraulic fluid under pressure from said pressure source to said fluid chambers through said inlet port in accordance with relative displacement of said piston shaft and said valve spool.

2. A power-assisted gear-shift mechanism as recited in claim 1, wherein said second lateral shaft is in the form of a hollow shaft rotatably mounted on said first lateral shaft and rotatably supported in place within said lateral casing, and wherein a slide sleeve is axially slidably mounted on said hollow shaft and being connected to said manual shift lever to be axially moved in selecting operation of said shift lever, said slide sleeve being integrally provided with a shift-and-select lever which extends into the interior of said transmission housing to be selectively engaged with the shift heads in axial movement of said slide sleeve.

3. A power-assisted gear-shift mechanism as recited in claim 1 or 2, wherein a first swingable arm member is connected at a base portion thereof to one end of said first lateral shaft for rotation therewith and engaged at a movable end thereof with said valve spool to cause axial movement of said valve spool in rotation of said first lateral shaft, and wherein a second swingable arm member is connected at a base portion thereof to one end of said second lateral shaft for rotation therewith and engaged at a movable end thereof with said piston shaft to cause rotation of said second lateral shaft in axial movement of said piston shaft.

4. A power-assisted gear-shift mechanism as recited in claim 3, wherein one of said swingable arm members is integrally provided with a pair of circumferentially spaced stoppers which are arranged to restrict rotation of the other arm member by abutment therewith in a predetermined extent.

5. A power-assisted gear-shift mechanism as recited in claim 3, wherein one of said swingable arm members is formed at the base portion thereof with a semi-circular recess, while the other swingable arm member is formed at the base portion thereof with a projection of semi-circular cross-section which is coupled within the semi-circular recess of said swingable arm member to restrict relative rotation of said lateral shafts in a predetermined extent.

6. A power-assisted gear-shift mechanism as recited in claim 1 or 2, wherein said piston shaft and said valve spool are connected to each other at their one ends by means of a resilient member to be relatively displaced in accordance with operation torque applied to said first lateral shaft.

7. A power-assisted gear-shift mechanism as recited in claim 6, wherein said resilient member consists of a pair of parallel leaf springs connected to each other at their one ends, one of said leaf springs being fixed at another end thereof to one end of said piston shaft, and the other leaf spring being fixed at another end thereof to one end of said valve spool.

8. A power-assisted gear-shift mechanism as recited in claim 1, wherein said second lateral shaft is resiliently retained in a neutral position by means of a pair of opposed compression springs engaged therewith.

9. A power-assisted gear-shift mechanism as recited in claim 2, wherein said slide sleeve is resiliently retained in a neutral position by means of a pair of opposed compression springs engaged therewith.

10. A power-assisted gear-shift mechanism as recited in claim 1 or 2, wherein a first cavity formed in one end portion of said cylinder casing is communicated with a second cavity formed in another end portion of said cylinder casing such that said piston shaft is applied at opposite ends thereof with an exhausted hydraulic pressure.

11. A power-assisted gear-shift mechanism as recited in claim 10, wherein said valve spool is formed therein with an axial bore for providing fluid communication between said first and second cavities.

12. A power-assisted gear-shift mechanism as recited in claim 10, wherein said cylinder casing is formed in its peripheral wall with a passage for fluid communication between said first and second cavities.

* * * * *